United States Patent [19]

Nakashima et al.

[11] Patent Number: 4,609,593

[45] Date of Patent: Sep. 2, 1986

[54] MAGNETIC RECORDING MEDIUM

[75] Inventors: Keishi Nakashima, Yunotani; Takashi Hatanai; Koichi Mukasa, both of Koide; Yutaka Shimada, Sendai, all of Japan

[73] Assignee: Alps Electric Co., Ltd., Japan

[21] Appl. No.: 630,898

[22] Filed: Jul. 16, 1984

[30] Foreign Application Priority Data

Jul. 16, 1983 [JP] Japan .................. 58-128718

[51] Int. Cl.$^4$ ............................... H01F 1/00
[52] U.S. Cl. .................... 428/611; 428/624; 428/625; 428/626; 428/630; 428/667; 428/668; 428/678; 428/928; 360/134; 360/135; 360/136; 148/403
[58] Field of Search ................. 148/403; 420/435; 428/611, 624, 625, 626, 630, 667, 668, 678, 928; 360/134, 135, 136

[56] References Cited

FOREIGN PATENT DOCUMENTS

| 58-50639 | 3/1983 | Japan . | |
|---|---|---|---|
| 58-55557 | 4/1983 | Japan | 148/403 |
| 59-79434 | 5/1984 | Japan | 428/667 |
| 59-98322 | 6/1984 | Japan | 428/667 |

Primary Examiner—John P. Sheehan
Attorney, Agent, or Firm—Guy W. Shoup

[57] ABSTRACT

A perpendicular magnetic recording medium composed of a base material, a 1st magnetic thin layer formed on the base material, and a perpendicularly magnetizable 2nd magnetic thin layer formed on the 1st magnetic thin layer, wherein the 1st magnetic thin layer is composed of a Co-base ternary amorphous alloy containing small amounts of Hf and Ta.

6 Claims, 4 Drawing Figures

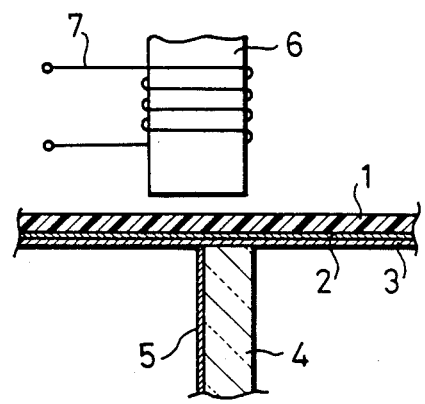

MAGNETIC RECORDING MEDIUM

FIELD OF THE INVENTION

This invention relates to a magnetic recording medium for perpendicular magnetic recording using a soft magnetic material of high permeability composed of an amorphous cobalt-base alloy.

BACKGROUND OF THE INVENTION

It has hitherto been investigated to increase the recording density and the reproducing density of magnetic recording media used for the foregoing perpendicular recording system. A magnetic recording medium composed of a base material, a 1st magnetic thin layer formed on the surface of the base material, and a 2nd magnetic thin layer formed on the 1st magnetic thin layer, which can record desired data by magnetization in the thickness direction of the 2nd magnetic thin layer, that is, in the perpendicular direction, has now been developed.

The foregoing 1st magnetic thin layer has a role of forming a part of a magnetic pass in the case of magnetizing the 2nd magnetic thin layer and is required to possess a low coercive force and a high permeability as well as a high saturation magnetic flux density. On the other hand, the 2nd magnetic thin layer is required to possess an anisotropy in the perpendicular direction of the layer. As a material meeting the requirement for the 2nd magnetic thin layer, there are cobalt-chromium system alloys such as cobalt-chromium binary alloy and a ternary alloy composed of cobalt, chromium, and a third metal such as rhodium.

On the other hand, permalloy is usually used for the 1st magnetic thin layer but permalloy does not have a sufficient permeability and saturation magnetic flux density. Furthermore, permalloy is inferior in so-called affinity in magnetic properties with the 2nd magnetic thin layer composed of the foregoing cobalt-chromium system alloy. That is, when the 2nd magnetic thin layer composed of the cobalt-chromium system alloy is formed on the 1st magnetic thin layer composed of permalloy having a face centered cubic lattice in the crystal structure, the formation of a hexagonal system in crystal structure of the thin layer of the cobalt-chromium system alloy is obstructed by the influence of the thin layer of permalloy disposed under the cobalt-chromium system alloy thin layer (in particular, owing to the thinness of the 2nd magnetic thin layer), whereby the excellent perpendicular anisotropy, which is a feature of a cobalt-chromium system alloy, cannot sufficiently be attained. Thus, since permalloy is inferior in affinity in magnetic characteristics with a cobalt-chromium system alloy and does not have a sufficiently high permeability and saturation magnetic flux density as described above, the conventional magnetic recording medium having the foregoing layer structure has a fault that even if a cobalt-chromium system alloy having excellent magnetic characteristics is used for the 2nd magnetic thin layer, the excellent properties of the alloy cannot sufficiently be utilized.

SUMMARY OF THE INVENTION

The object of this invention is to increase the recording density and the reproducing density of a magnetic recording medium for a perpendicular magnetic recording system.

As the result of various investigations on amorphous alloy thin layers or films obtained by sputtering, etc., the inventors have discovered that a cobalt-hafnium-tantalum ternary amorphous alloy mainly composed of cobalt and containing hafnium and tantalum, wherein the content of said hafnium is from 1 atom% to 5 atom%, perferably from 1.5 atom% to 3 atom% and the content of said tantalum is from 4 atom% to 10 atom%, preferably from 6 atom% to 8 atom%, has excellent properties as a soft magnetic material and, further, the foregoing soft magnetic material is very suitable as the material for the 1st magnetic thin layer of a perpendicular magnetic recording medium.

That is, according to this invention, there is provided a magnetic recording medium comprising a base material, a 1st magnetic thin layer formed on the surface of the base material, and a 2nd magnetic thin layer having a perpendicular anisotropy and formed on the surface of the 1st magnetic thin layer, said 2nd magnetic thin layer being magnetized in the thickness direction, wherein said 1st magnetic thin layer is composed of a cobalt-based ternary amorphous alloy containing small amounts of hafnium and tantalum.

BRIEF DESCRIPTION OF THE DRAWINGS

FIG. 4 is a schematic view for explaining the state of using the magnetic recording medium of this invention.

DESCRIPTION OF THE PREFERRED EMBODIMENT

A crystal glass is used as a base plate and pellets of hafnium and pellets of tantalum (each pellet having 10 mm×10 mm in area and 5 mm in thickness) are alternately disposed on a cobalt disk (101.6 mm in diameter and 5 mm in thickness) radially from the center of the disk, whereby the composition of the alloy formed on the base plate by sputtering can be changed by controlling the number of the pellets on the target. Then, a chamber containing the foregoing system is evacuated to high vacuum of lower than $1\times10^{-6}$ Torr and sputtering is performed in an argon gas atmosphere at a high frequency electric power of 2.0 watts/cm$^2$ to form a cobalt-base Co-Hf-Ta ternary amorphous alloy on the base plate. The amorphous alloys having various compositions formed as above described are used for various property tests as set forth hereinafter.

Figure 1:
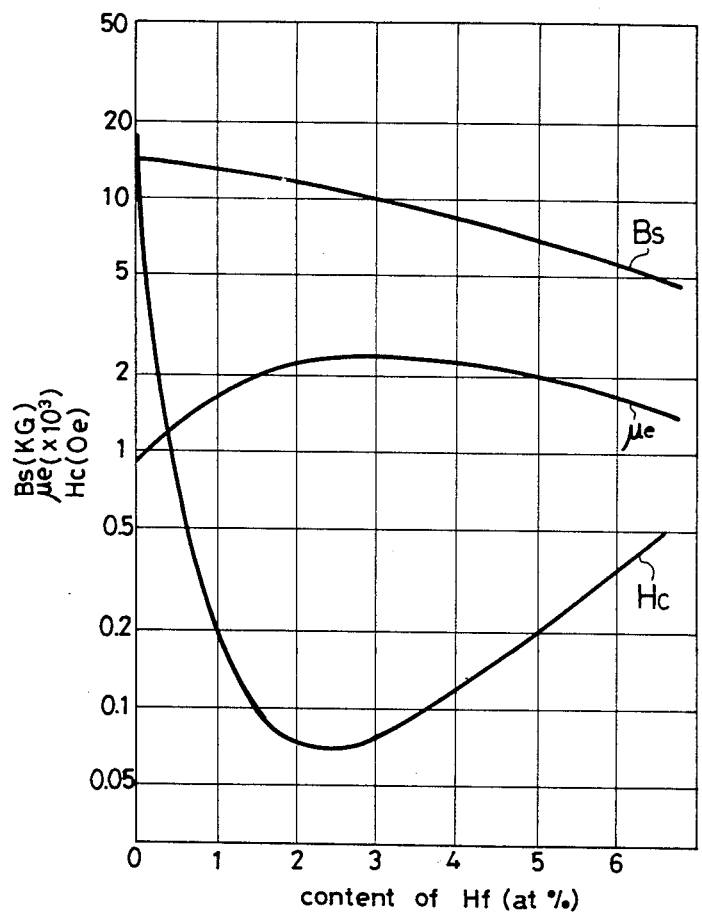
FIG. 1 is characteristic graph showing the relation between the Hf content in Co-Hf-Ta system amorphous alloys and various magnetic properties.

FIG. 1 is a magnetic characteristic graph in the case of changing the content X of hafnium in the alloy shown in the alloy composition table shown below while always keeping the content Y of tantalum in the alloys at 4.5 atom%.

| Alloy composition table | |
| --- | --- |
| Co | 100-X-Y atom % |
| Hf | X atom % |
| Ta | Y atom % |

In addition, in the graph of FIG. 1, the curve Bs shows a saturation magnetic flux density, the curve $\mu_e$ a permeability in the sparingly magnetizable axis direction at a frequency of 1 MHz, and the curve of Hc a coercive force in the sparingly magnetizable axis direction.

As is clear from the graph, the Co-Ta binary alloy containing no Hf has high Bs but is too high in Hc and low in $\mu_e$. However, when a small amount of Hf is present in the alloy, Hc greatly decreases, while $\mu_e$ increases in contrast with this. In addition, when the content of Hf is over a certain level, Hc becomes high and $\mu_e$ becomes low. On the other hand, Bs tends to decrease with the increase of the content of Hf although the decreasing extent is not so extreme.

In order to decrease Hc and increase $\mu_e$ without decreasing Bs too much in such a tendency of magnetic properties, it is necessary that the content X of Hf be in the range of from 1 atom% to 5 atom%, preferably from 1.5 atom% to 3 atom%. This is also true when the content Y of Ta is changed to some extent.

Figure 2:
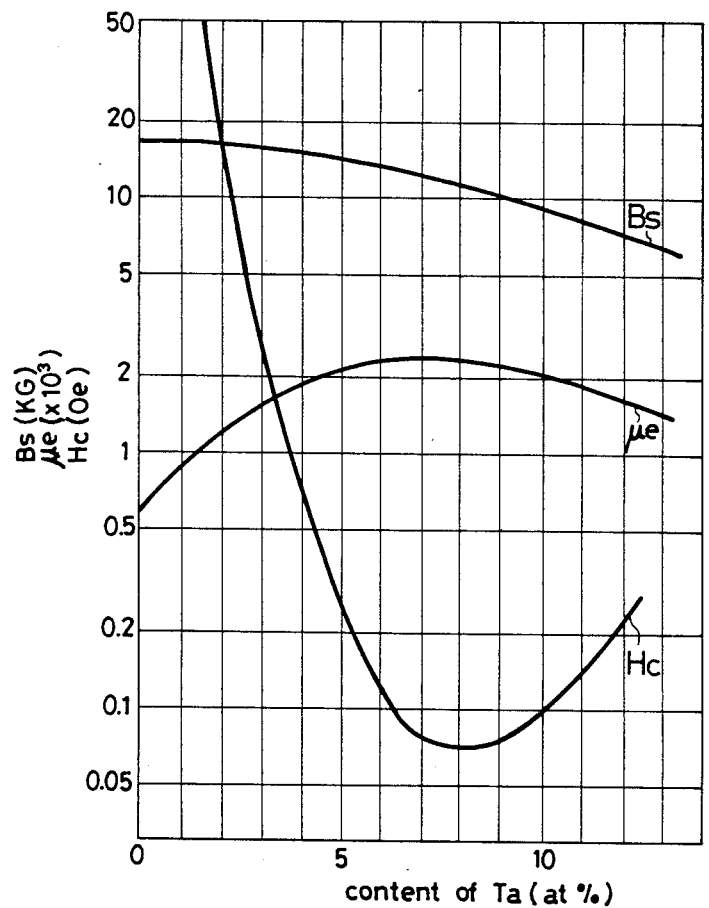
FIG. 2 is a characteristic graph showing the relation between the Ta content in the foregoing alloys and various magnetic properties.

FIG. 2 is a magnetic characteristic graph showing the case of changing the content Y of Ta in the alloy shown in the foregoing alloy composition table while always keeping the content X of Hf in the alloy at 2.2 atom%.

As is clear from the graph, in a Co-Hf binary alloy containing no Ta, Bs is high but Hc is too low and $\mu_e$ is low. However, when a small amount of Ta is present in the alloy, Hc becomes extremely low but $\mu_e$ becomes high in contrast with this. In addition, when the content of Ta is over a certain level, Hc becomes high and $\mu_e$ becomes low. On the other hand, Bs tends to decrease with the increase of the content of Ta although the reducing extent is not so extreme.

In order to reduce Hc and increase $\mu_e$ without reducing Bs too much in such a tendency of magnetic properties, it is necessary that the content Y of Ta be in the range of from 4 to 10 atom%, preferably from 6 to 8 atom%.

This is also true when the content X of Hf is changed to some extent.

Figure 3:
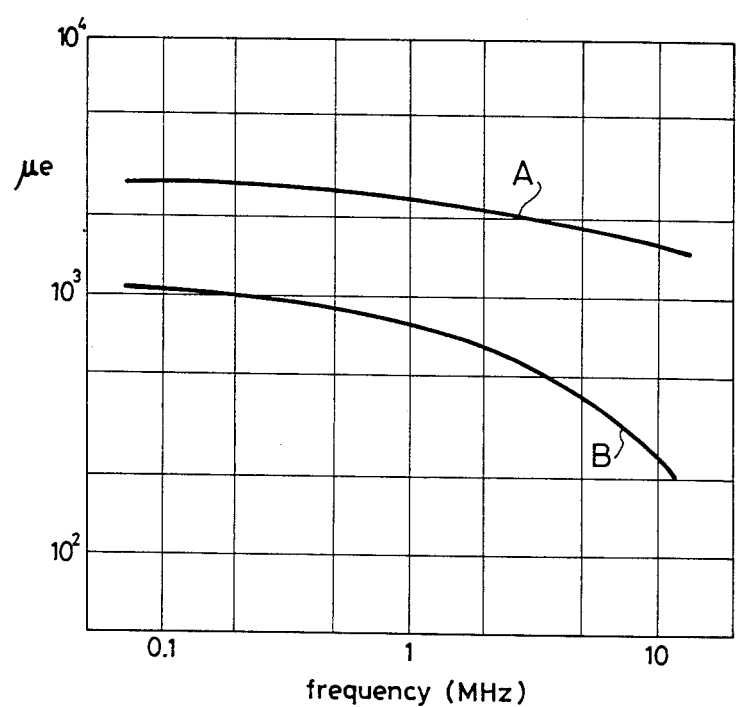
FIG. 3 is magnetic characteristic curves of the foregoing alloy and a comparison alloy at each frequency.

FIG. 3 is a graph showing $\mu_e$ of a ternary amorphous alloy composed of Co (93.3 atom%), Hf (2.2 atom%), and Ta (4.5 atom%) (Curve A) and $\mu_e$ of a binary amorphous alloy composed of Co (97.8 atom%) and Hf (2.2 atom%) (Curve B) at each frequency.

As is clear from the graph, the soft magnetic material of this invention always has a high permeability at each frequency and shows stable characteristics in a wide frequency range.

Now, a Co-Hf-Ta ternary alloy shows a high anisotropic magnetic field in the thin layer thereof immediately after the formation thereof by sputtering. As the result of various investigations on the means for reducing the anisotropic magnetic field, it has been discovered that a method of heat-treating the ternary amorphous alloy thin layer formed as a principal magnetic pole in a rotating magnetic field is effective. The conditions for the heat treatment in the rotating magnetic field are selected from a rotation speed of 10 to 20 r.p.m., a magnetic field intensity of higher than 100 $O_e$ and a treatment time of longer than 3 hours. For example, when the thin layer of the alloy formed by sputtering is treated at a temperature of 350° C., at a rotation speed of 10 r.p.m., and a magnetic field intensity of 100 $O_e$, the anisotropic magnetic field (Hk) can be reduced to about 4 $O_e$.

FIG. 4 is a schematic view explaining a state of using the magnetic recording medium using the foregoing soft magnetic material.

A Co-Hf-Ta ternary amorphous alloy composed of 93.3 atom% Co, 2.2 atom% Hf, and 4.5 atom% Ta is formed on the surface 1 of a base material composed of a synthetic resin such as polyester, polyimide, etc., or an anodically oxidized aluminum plate by sputtering to provide a 1st magnetic thin layer 2. Then, a Co-Cr binary alloy thin layer composed mainly of Co having added thereto a small amount of Cr is formed on the surface of the 1st magnetic thin layer 2 by sputtering to provide a 2nd magnetic thin layer 3. The thicknesses of these thin layers are about 0.3 $\mu$m. A tape-form or disk-form magnetic recording medium is formed from the foregoing material composed of a base material 1, the 1st magnetic thin layer 2, and the 2nd magnetic thin layer 3. As the case may be, the foregoing magnetic thin layers 2 and 3 may be formed on both surfaces of the base material 1.

A principal magnetic pole 5 and an auxiliary magnetic pole 6 are disposed with the magnetic recording medium between them. The principal magnetic pole 5 has a thickness of about 1 $\mu$m and is formed on a nonmagnetic base plate 4 composed of a glass or a polyimide resin. A coil 7 is coiled around the auxiliary magnetic pole 6 at a definite turn. When a signal electric current is passed through the coil 7 to magnetize the principal magnetic pole 5 from the side of the auxiliary magnetic pole 6, a strong perpendicular magnetic field is generated near the end of the principal magnetic pole 5, whereby the magnetic thin layers 2 and 3 near the end of the principal magnetic pole 5 are magnetized in the thickness direction of the layers and the data are recorded in the 2nd magnetic thin layer 3. In this case, the 1st magnetic thin layer 2 contributes to constitute a part of the magnetic pass at the case of magnetically recording the data in the 2nd magnetic recording thin layer 3.

As described above, by defining the content of Hf to the range of 1 atom% to 5 atom% and the content of Ta to the range of 4 atom% to 10 atom% in a Co-base Co-Hf-Ta ternary amorphous alloy, a soft magnetic material having a low coercive force and a high permeability can be obtained without reducing a saturation magnetic flux density too much and by using the foregoing soft magnetic material as the 1st magnetic thin layer of a magnetic recording medium composed of a base material, a 1st magnetic thin layer, and a 2nd magnetic thin layer having a perpendicular anisotropy and formed on the magnetic thin layer, the following excellent effects are obtained.

That is, the ternary amorphous alloy forming the 1st magnetic thin layer has low coercive force and high permeability and saturation magnetic flux density as well as has very similar magnetic characteristics to those of a cobalt-chromium system alloy forming the 2nd magnetic thin layer, whereby the cobalt-chromium alloy formed on the 1st magnetic thin layer can exhibit the excellent magnetic anisotropy thereof as it is. Thus, the magnetic recording medium of this invention has excellent recording and reproducing characteristics and in the magnetic recording medium of this invention the thickness of the 2nd magnetic thin layer can be reduced as thin as possible.

What is claimed is:

1. A magnetic recording medium comprising a base material, a 1st magnetic thin layer formed on the surface of the base material, and a 2nd magnetic thin layer formed on the surface of the 1st magnetic layer and having a perpendicular anisotropy, said 2nd magnetic thin layer being capable of recording data by magnetization in the thickness direction thereof, wherein said 1st magnetic thin layer is composed of a cobalt-based ternary amorphous alloy containing hafnium and tantalum where the content of said hafnium is in the range of from 1 atom% to 5 atom% and the content of said tantalum is in the range of 4 atom% to 10 atom%.

2. The magnetic recording medium as claimed in claim 1, wherein said 2nd magnetic thin layer is composed of a cobalt-chromium system alloy.

3. A magnetic recording medium according to claim 1 wherein said content of hafnium is in the range 1.5 atom% to 3 atom%.

4. A magnetic recording medium according to claim 3 wherein said content of tantalum is 4.5 atom%.

5. A magnetic recording medium according to claim 1 wherein said content of tantalum is in the range 6 atom% to 8 atom%.

6. A magnetic recording medium according to claim 5 wherein the content of said hafnium is 2.2 atom%.

* * * * *